US011086710B2

(12) United States Patent
Raghunathan et al.

(10) Patent No.: US 11,086,710 B2
(45) Date of Patent: Aug. 10, 2021

(54) PREDICTIVE DISASTER RECOVERY SYSTEM

(71) Applicant: INTERNATIONAL BUSINESS MACHINES CORPORATION, Armonk, NY (US)

(72) Inventors: Ravi Kumar Raghunathan, Bangalore (IN); Sukumar Madawat, Bengaluru (IN); Kajol Jain, Ashok Nagar (IN); Prabhleen Kaur, Saharanpur (IN); Mayank Shrivastava, Bhopal (IN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/524,824

(22) Filed: Jul. 29, 2019

(65) Prior Publication Data

US 2021/0034448 A1 Feb. 4, 2021

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0793* (2013.01)

(58) Field of Classification Search
CPC ...... G06F 11/00; G06F 11/22; G06F 11/1402; G06F 11/1446; G06F 11/1448; G06F 11/1458
USPC ...................................................... 714/1–57
See application file for complete search history.

(56) References Cited

U.S. PATENT DOCUMENTS

| 7,035,765 | B2* | 4/2006 | Tanahashi | G01W 1/10 |
| | | | | 702/182 |
| 9,727,591 | B1* | 8/2017 | Sharma | G06F 21/6227 |
| 9,805,104 | B2 | 10/2017 | Talius et al. | |
| 10,872,099 | B1* | 12/2020 | Gharpure | G06F 9/45558 |
| 2009/0125751 | A1* | 5/2009 | Dawson | G06F 11/1458 |
| | | | | 714/2 |
| 2016/0112504 | A1 | 4/2016 | Mathur et al. | |
| 2017/0093750 | A1* | 3/2017 | McBride | H04L 47/762 |
| 2017/0308421 | A1* | 10/2017 | Angeles | G06F 11/0709 |
| 2017/0329529 | A1* | 11/2017 | Chopra | G06F 11/1451 |
| 2020/0304392 | A1* | 9/2020 | Sanders | H04L 43/0852 |

* cited by examiner

*Primary Examiner* — Sarai E Butler
(74) *Attorney, Agent, or Firm* — Schmeiser, Olsen & Watts, LLP; Stephanie Carusillo

(57) ABSTRACT

A method, system and computer program product includes receiving data including parameters affecting recovery point objectives for a disaster recovery plan, analyzing the parameters and determining responsible factors behind recovery point objective deviation based on the analyzing.

20 Claims, 10 Drawing Sheets

PREDICTIVE DISASTER RECOVERY SYSTEM

TECHNICAL FIELD

The present invention relates to disaster recovery. More specifically, the invention relates to systems and methods for providing predictive disaster recovery tools for cloud services.

BACKGROUND

Disaster recovery (DR) involves a set of policies and procedures to enable the recovery or continuation of vital technology infrastructure and systems following a natural disaster or man-made event. Disaster recovery focuses on the information technology (IT) systems supporting critical business functions, as opposed to business continuity, which involves keeping all essential aspects of a business functioning despite significant disruptive events. Disaster recovery is therefore a subset of business continuity. A business continuity plan (BCP) includes planning for non-IT related aspects such as key personnel, facilities, crisis communication and reputation protection, and should refer to the disaster recovery plan (DRP) for IT related infrastructure recovery/continuity. IT disaster recovery control measures can be classified into the following three types: preventive measures (controls aimed at preventing an event from occurring), detective measures (controls aimed at detecting or discovering unwanted events), and corrective measures (controls aimed at correcting or restoring the system after a disaster or an event). Good disaster recovery plan measures dictate that these three types of controls be documented and exercised regularly. Two important measurable objectives in a disaster recovery plan are the Recovery Time Objective (RTO) and the Recovery Point Objective (RPO). The RTO is the goal, measured in time, for how quickly an IT system is back online after a downtime event. The RPO is the goal, also measured in time, for the point in time to which data must be restored to resume services after a downtime event. RPO is often thought of as the time between the last data backup and the time a downtime event occurred.

SUMMARY

An embodiment of the present invention relates to a method, and associated computer system and computer program product. One or more processors of a computer system receive data including parameters affecting recovery point objectives for a disaster recovery plan. The one or more processors analyze the parameters and determine responsible factors behind recovery point objective deviation based on the analyzing.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Embodiments of the present invention include systems and methods for cognitive predictions for disaster recovery (DR), Specifically, the DR solution proposed includes both providing present recovery point objective (RPO) deviations for a DR plan, but also predicts future values for RPO deviations based on the cognitive predictions. Further, the present invention may include determining reasons for RPO deviations so that recommendations can be made to rectify those deviations. Still further, embodiments of the present invention provide systems and methods for determining service level agreement (SLA) trends, determine why SLA trends occur, and providing recommendations to improve SLA trends. The present invention provides a DR system that is capable of recommending the right time to perform DR operations and the combination of DR operations that together reduce the RPO deviations the most.

Figure 1:
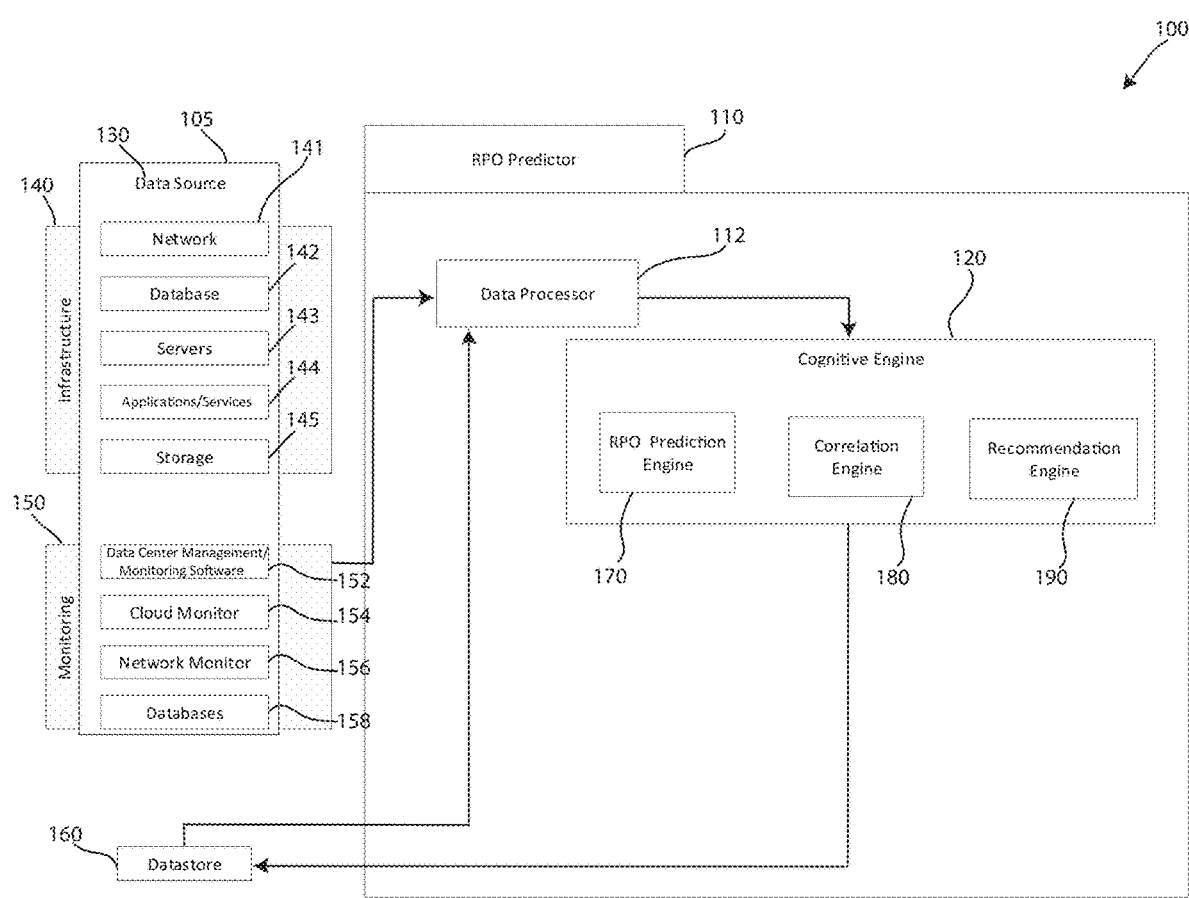
FIG. 1 depicts an embodiment of a disaster recovery system, in accordance with embodiments of the present invention.

FIG. 1 depicts an embodiment of a DR system 100, in accordance with embodiments of the present invention. The DR system 100 is shown including a Recovery Point Objective (RPO) Predictor 110 that includes a data processor 112 and a cognitive engine 120. The cognitive engine 120 includes each of an RPO prediction engine 170, a correlation engine 180 and a recommendation engine 190, The DR system 100 further is shown including an entity 105 having many data sources 130 including infrastructure data sources 140, monitoring data sources 150 and a datastore 160. The infrastructure data sources 140 include at least one network 141, a database 142, servers 143, applications and/or services 144 and storage 145. The monitoring data sources 150 may include one or more of a data center management monitoring, reporting, testing, and workflow automation software 152, a cloud monitor 154, a network monitor 156 and one or more databases 158.

The DR system 100, and more particularly the RPO predictor 110, uses machine learning and cognitive engines to predict SLA parameters used in DR and cyber incident recovery (CIR) monitoring, reporting, testing, and workflow automation. The DR system 100 and/or RPO predictor 110 helps entities not only know future RPOs and also will help in determining the factors responsible for the resultant RPO deviations in a DR plan so that an entity can plan its activities accordingly. The DR system 100 and RPO predictor 110 is configured for pre-determining possible factors responsible for deviation with the scope of additional new factors when those new factors arise.

The DR system 100 and/or RPO predictor 110 may be configured to data scrape the historical SLA trends of other entities than the entity 105, along with values of suggested parameters which can be stored in the datastore 160. The DR system 100 and/or RPO predictor 110 may be configured to learn the relation between the RPO deviations and the prominent factors behind the RPO deviations for each of the applications and/or services 144 of the system. The DR system 100 and/or RPO predictor 110 may be configured to provide the entity 105 and/or IT administrators thereof, recommendations of which operations should be done in what order to get the least RPO deviation, and also provide recommendations as to which operations will impact RPO deviation the greatest. Further contemplated is that the DR system 100 and/or the RPO predictor 110 may be configured to create a feedback loop as additional data sources are injected into the systems from different entities to retrain the RPO predictor models dynamically with machine learning and cognitive learning trees, such as random forest classifiers. The DR system 100 and/or the RPO predictor may be configured to provide multiple predictions and may identify and retrain itself in the event that a high error rate is captured. The DR system 100 and/or the RPO predictor 110 may further be configured to find the co-relations between the factors responsible for RPO deviations, and indicate the specific impact of each specific factor on a given RPO deviation.

The entity 105 may be one or more entities associated with a DR plan. For example, entity 105 may be one or more businesses, partnerships, governmental body, consortium, educational institution, financial institution, charity, or any other entity that has an IT system with various sources of data and a need for a DR plan. It should be understood that the entity 105 is exemplary and that other entities are contemplated that include less data sources, or more data sources, than the exemplary data sources shown in FIG. 1.

The data sources 140 shown may include the technology infrastructure 140 of the entity 105 associated with a DR plan. The infrastructure 140 may include various information technology and technology systems. The infrastructure 140 may embody an entity such as a business enterprise, and their associated information technology systems. Such a business enterprise may use the RPO predictor 110 as a part of their DR technology, policies, tools or the like. The RPO predictor 110 may be a hosted by a separate entity from the business enterprise embodied by the infrastructure 140. In other embodiments, the RPO predictor 110 may be a system that is owned and operated in-house by the business enterprise that includes the infrastructure 140 shown.

The infrastructure 140 shown includes the network 141 which may represent one or more computer systems linked together. The network 141 may represent, for example, the internet. The network 141 may be any type of computer network known by individuals skilled in the art. Examples of computer networks which may be embodied by the network 141 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 141 may be a peer-to-peer network in some embodiments, wherein in other embodiments, the network 141 may be organized as a client/server architecture. The network 141 may include one a combination of various different network architectures. The network 141 may include one or more devices, databases or the like, that are connected to across the internet, and may further be connected to the RPO predictor 110 over the internet.

The databases 142 may be a network repository, a data collection area on the network 141 which may back up and save all the data transmitted back and forth between the nodes of the network 141. For example, the databases 142 may be one or more data centers saving and cataloging data sent between the nodes of the network 141. The databases 142 may be created and/or populated by the servers 143 related to the information received. In some embodiments, a data collection center housing the databases 142 and/or servers 143 may include an analytic module capable of analyzing data being stored by the databases 142. The databases 142 may be further store data accumulated or otherwise acquired through the running of the applications and/or services 144.

The servers 143 may be any type of computer program or device that provides functionality to the network 141, databases 142, applications and/or services 144 and/or storage devices 145 of the infrastructure 140 system. The servers 14 may provide various services to the other clients in the infrastructure 140 system. The servers 143 may represent a single server device, or many servers connected via the network 141. The servers 143 may include both local and backup servers.

The applications and/or services 144 may represent the various applications that an entity may utilize to provide a centralized IT management. Further, the applications and/or services 144 may represent the various applications that the entity utilizes that must remain operational for the entity to function properly. The ability to operate the applications and/or services 144 by the entity may be hindered or prevented during a disaster scenario. The DR system 100 may be configured to provide DR solutions for bringing the applications and/or services 144 back to an operational state after a disaster scenario.

The storage 145 may be any infrastructure storage device(s) or system(s). The storage 145 may include physical storage locations in which the various databases 142, applications and/or services 144 and software related to the servers 143 is stored. The storage 145 may be located in one physical location, or a plurality and may include backup storage, or the like. The storage 145 may be accessible by the various other infrastructure systems 141, 142, 143, 144.

It should be understood that the infrastructure 140 is shown as an exemplary business entity infrastructure, and may include any information technology infrastructure device(s), system(s) and software known in the art. While not shown, the infrastructure systems 141, 142, 143, 144, 145 may provide information directly to the RPO predictor 110. In some embodiments, the infrastructure systems 141, 142, 143, 144, 145 may provide data and information to the datastore 160 for storage therein and communication with the RPO predictor 110. In some embodiments, the monitoring data sources 150 may provide software and/or hardware systems for monitoring the various infrastructure systems 141, 142, 143, 144, 145 and provide this information to the RPO predictor 110. Thus, the monitoring data sources 150 may include various monitoring systems 152, 154, 156, 158 for monitoring the various infrastructure systems 141, 142, 143, 144, 145 and provided needed information to the RPO predictor 110 and the data processor 112 thereof.

The datacenter management and/or monitoring software 152 may be a software system of the entity for providing DR and CIR monitoring, reporting, testing, workflow automation capabilities and the like. The datacenter management and/or monitoring software 152 may include IT discovery and resiliency services. The datacenter management and/or monitoring software 152 may provide DR options, maintain DR readiness in the cloud, help facilitate CIR, automate DR processes, improve reporting for the purposes of DR auditing and compliance management, and track and improve existing RPO, RTO and SLA. The datacenter management and/or monitoring software may be configured automate drill failover management, and generally simplify and accelerate DR processes. Examples of the datacenter management and/or monitoring software 152 may be IBM Resiliency Orchestration®.

The cloud monitor 154 may be configured to monitor cloud web services resources and the applications you run on such cloud web services in real time. The cloud monitor 154 may be configured to provide actionable insights related to applications based on collected data such as logs, metrics, events or the like. The cloud monitor 154 may be configured to monitor information related to resources and services or applications that run on the cloud.

The network monitor 156 may provide similar functionality as the cloud monitor 154, but may be configured to monitor local network systems, such as servers, switches, applications and services that are not cloud-based.

Each of the cloud monitor 154 and the network monitor 156 may provide data to the data processor 112. Alternatively or additionally, the cloud monitor 154 and the network monitor 156 may provide information to the datacenter management and/or monitoring software 152. The datacenter management and/or monitoring software 152 may then be the only necessary monitoring system that feeds information to the RPO predictor 110.

The one or more monitoring databases 158 may be databases associated with any of the datacenter management and/or monitoring software 152, the cloud monitor 154 and/or the network monitor 156. The monitoring databases 158 may be configured to stored monitored information related to the IT infrastructure of the entity. In one embodiment, the DR monitoring software 158 may be in communication with the one or more monitoring databases 158 to obtain monitored information for processing.

The datastore 160 may be one or more repositories that are configured to store various IT related information for the entity. The stored information in the datastore 160 may be related to the infrastructure 140 or monitoring 150 aspects of the entity. The data store 160 may include information beyond simply the databases 142, 158. For example, the data store 160 may include simple files, emails, or any information managed by a file system or data base management system (DBMS).

The data processor 112 of the RPO predictor 110 may be may be one or more processors of a computer system. The data processor 112 may be configured to be provided, receive, or otherwise obtain the various forms of information or data that may be needed by the cognitive engine 120. The data processor 112 may be configured to determine the type of data that is received by the RPO predictor 110 and then provide this data to the appropriate module of the cognitive engine 120 for processing. The data processor 112 may be configured to import or feed historical time series data into the RPO predictor 110 at regular intervals, which includes both parameters and values for the historical time series data. This may include importing or feeding historical time series data related to RPO for each application at regular intervals.

Figure 2:
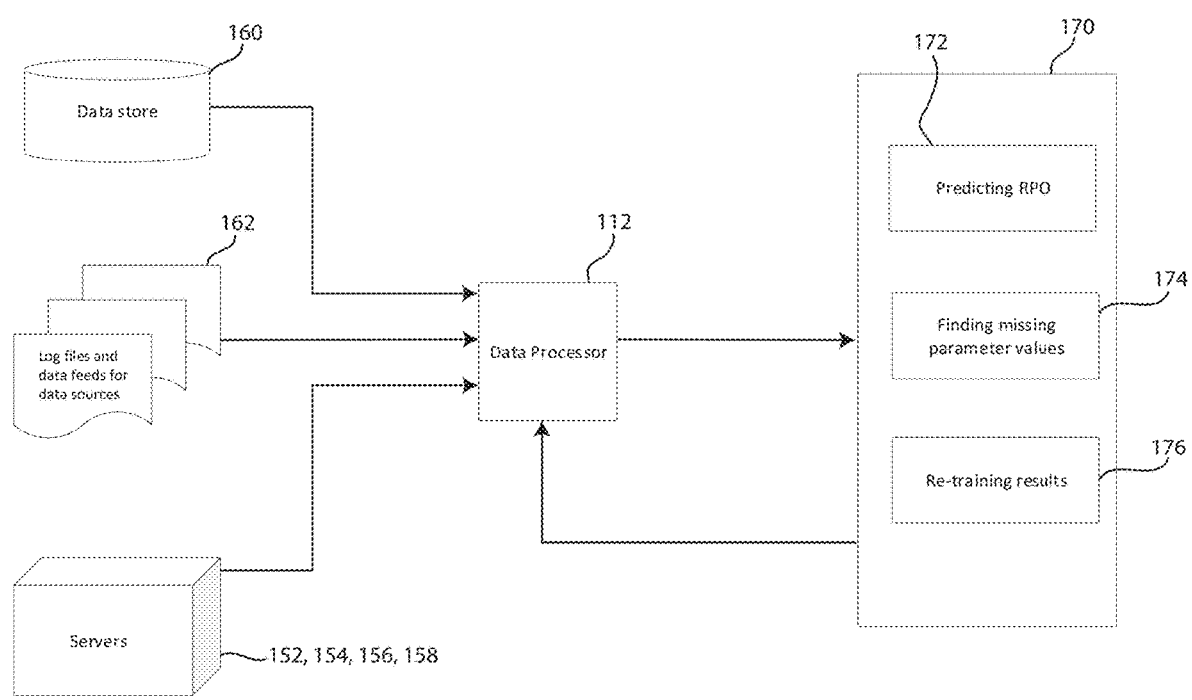
FIG. 2 depicts an embodiment of an RPO prediction engine of the disaster recovery system of FIG. 1, in accordance with embodiments of the present invention.

The data processor 112 may be configured to normalize all the parameters such that all the parameters have the same scale and/or timeline with respect to the RPO. For example, the data processor 112 may receive data related to various parameters relative to disaster recovery. For example, parameters may include, but are not limited to, bandwidth, input/output operations per second (IOPS), number of hits, server downtime, storage and/or disk latency, network latency, application performance, number of users using the applications and/or servers, memory usage, number of active and inactive servers (including virtual machines, containers, processors, services, etc.), application dependencies, time taken for operations on servers, networks and/or applications, state of the application and/or servers, and disk space usage by an application. Information related to these parameters may be received at various intervals. In many cases, these intervals may not be the same for each variable. For example, if information related to bandwidth is received every 5 minutes, but information related to IOPS is received every minute, this data may need to be "normalized" by the data processor 112. In this instance, the data processor 112 may particularly choose an interval that aligns with all the relevant parameters. In the exemplary case, this may mean picking to utilize data every 5 minutes, since both relevant parameters may include data at this time. In another example, normalization may include extrapolating the bandwidth data at the particular time that the analysis requires. Normalization may include some combination of choosing the time for analysis, and extrapolating for parameters in which data was not received at that particular time. In some events the data processor 112 may be configured to pick a time by using the knowledge of which parameters are more or less accurate for extrapolation. For example, some data that does not increase or decrease relatively linearly between time intervals may not be possible or desirable for extrapolation. FIG. 2 depicts an embodiment of the RPO prediction engine 170 of the DR system 100 of FIG. 1, in accordance with embodiments of the present invention. As shown, the RPO prediction engine 170 may be configured to receive information or data from the data store 160, the log files and data feeds for data sources 162 or the monitoring systems or servers 152, 154, 156, 158, This information or data may be provided to the data processor 112 of the RPO predictor 110, which may then pre-process the data and provide the necessary data to the RPO prediction engine 170.

This processed data may be provided to the RPO predictor 110 and the various modules therein—in particular the predicting RPO module 172, the finding missing parameter values module 174, and the re-training results module 176.

A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

The predicting RPO module 172 may be configured to make predictions and/or determine trends for RPO for each possible future data and time for each of the applications and/or services 144 associated with the infrastructure 140 of the entity 105. The predicting RPO module 172 may be configured to determine responsible factors behind RPO deviation in order to make the entity 105 aware about future RPO deviation and also the reason for future RPO deviations. The predicting RPO module 172 may be configured to determine these core parameters by analyzing SLA trends of different entities besides the entity 105 and use cognitive analytics to create a DR recovery model. The predicting RPO module 172 may be configured to predict an RPO for each possible future date and/or time for each application associated with a DR recovery plan. The predicting RPO module 172 may further be configured to predict values for each parameter for each future date and/or time. Thus, the predicting RPO module 172 may be configured to determine responsible factors behind RPO deviation at a future date and/or time.

The finding missing parameter values module 174 may be configured to review data from the datastore 160, the log files and data feeds for data sources 162 and the servers 152, 154, 156, 158 for parameter values. This may include predicting the values for various parameters in future dates and/or times. The values may be RPO values associated with different parameters. The re-training results module 176 may be configured to provide a feedback loop that incorporates new data sources as those are provided into the system in order to retrain the prediction module as the data processor 112 provides new information to the RPO prediction engine 170. This re-training by the re-training results module 176 may occur when it is determined that a high error rate found.

Figure 3:
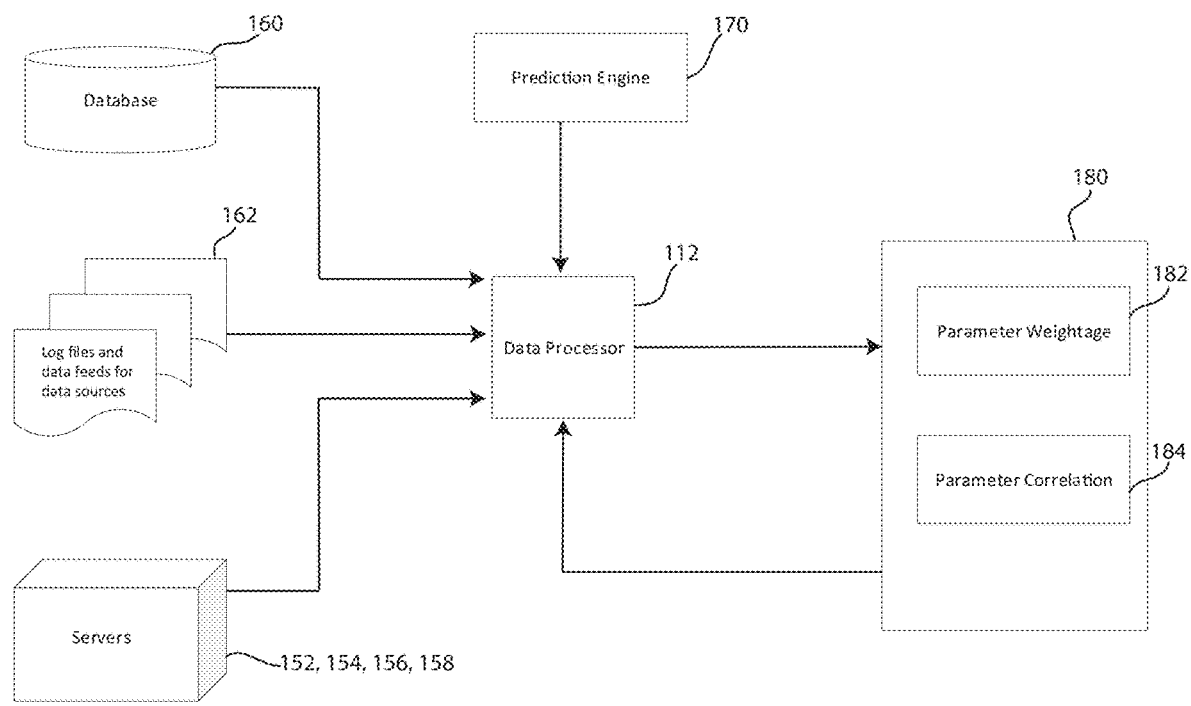
FIG. 3 depicts an embodiment of a correlation engine of the disaster recovery system of FIG. 1, in accordance with embodiments of the present invention.

FIG. 3 depicts an embodiment of the correlation engine 180 of the DR system 100 of FIG. 1, in accordance with embodiments of the present invention. Like the RPO prediction engine 170, the correlation engine 180 may be configured to receive information or data from the data store 160, the log files and data feeds for data sources 162 or the monitoring systems or servers 152, 154, 156, 158. This information or data may be provided to the data processor 112 of the RPO predictor 110, which may then pre-process the data and provide the necessary data to the correlation engine 180.

The correlation engine 180 includes a parameter weightage module 182 and a parameter correlation module 184. The parameter weightage module 182 may be configured to fetching previous predictions if any previous predictions exist and computing a weightage for each parameter to identify which parameter has influenced changes to RPO historically, taking into effect previous weightages that exist, if any previous weightages exist. The parameter weightage module 182 may be configured to compute weightages for each parameter to identify which parameters have influenced changes to the recovery point objectives historically for a given date and/or time. The parameter weightage module 182 may be configured to maintain all the predictions and weightages, for example, in the datastore 160 for future use.

The parameter correlation module 182 may be configured to determine a correlation between the responsible factors responsible for recovery point objective deviations. The parameter correlation module 182 may thus be configured to dynamically improve, with a feedback loop, a DR model related to the received information or data associated with the parameters and/or values that has been imported and/or fed into the system.

Figure 4:
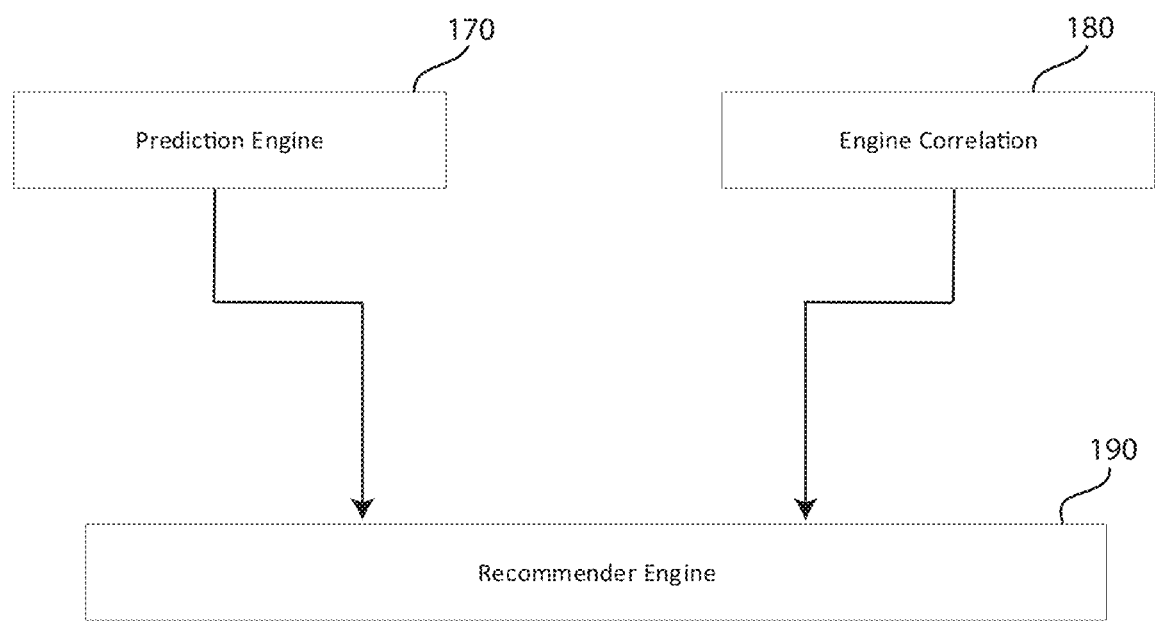
FIG. 4 depicts an embodiment of a recommendation engine of the disaster recovery system of FIG. 1, in accordance with embodiments of the present invention.

FIG. 4 depicts an embodiment of the recommendation engine 190 of the DR system 100 of FIG. 1, in accordance with embodiments of the present invention. The recommendation engine 190 is shown receiving input from the prediction engine 170 and the correlation engine 180. The recommendation engine 190 may be configured to analyze SLA trends of different customers, and recommend to those customers or entities, such as the entity 105, possible improvements based on determined factors in order to achieve better SLA trends. The recommendation engine 190 may be configured to further recommend improvements for a better and/or more accurate RPO for each application. These recommendations may be based on the predictions and correlations and inputs from the prediction engine 170 and the correlation engine 180. The recommendation engine 190 may be configured to recommend improvements to a DR plan based on determined responsible factors behind RPO deviations found by the RPO predictor 110. The recommendation engine 190 may provide a user interface to IT administrator devices that shows a dashboard with respect to each application that may include the following information for each application: A) a historical RPO; B) historical parameters and/or values and their weightages; and C) a predicted RPO, parameters and/or values for their weightages predicted to influence this predicted RPO in the future.

Figure 5:
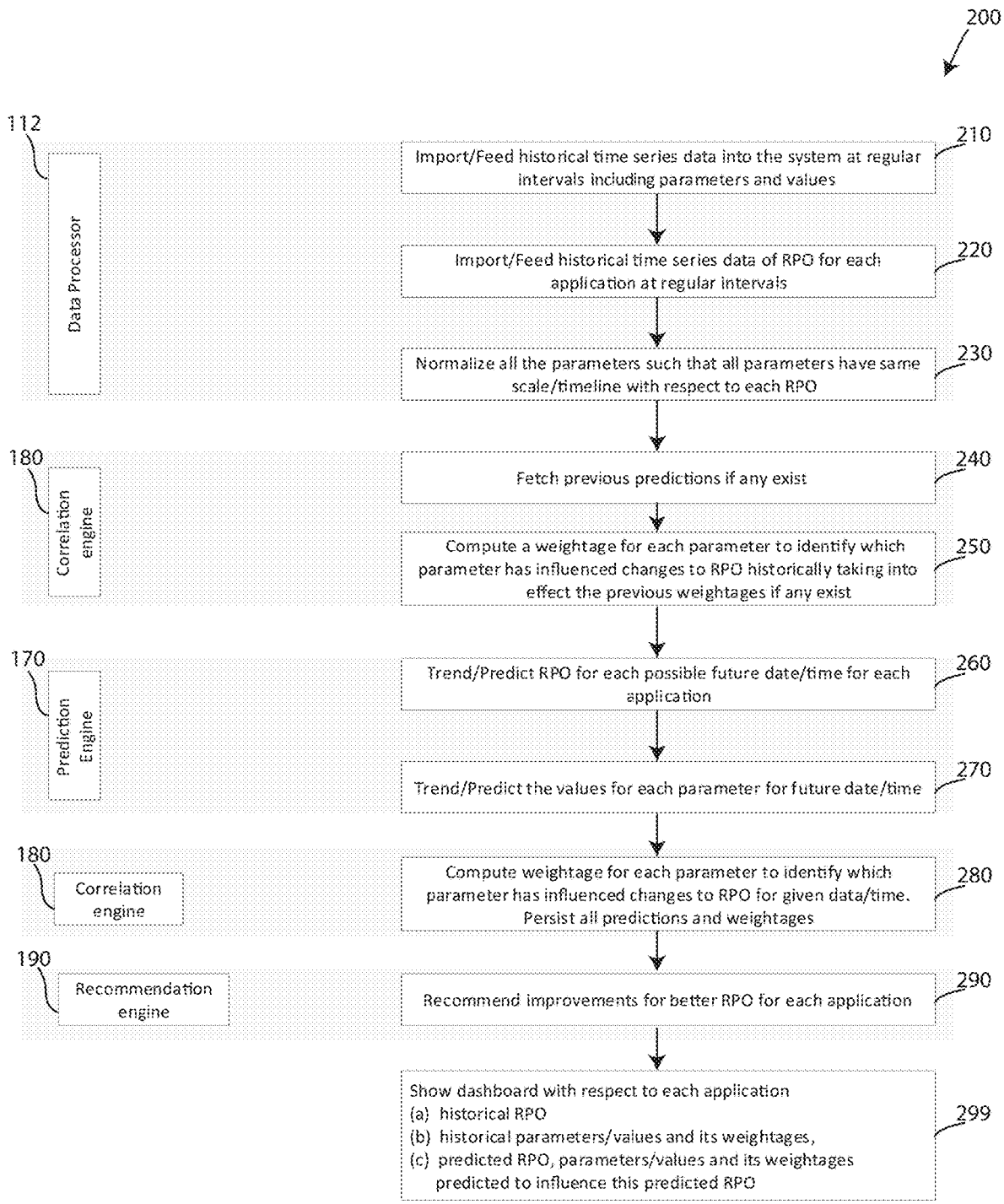
FIG. 5 depicts a flow chart of a method of predicting disaster recovery using the disaster recovery system of FIG. 1, in accordance with embodiments of the present invention.

FIG. 5 depicts a flow chart of a method 200 of predicting a DR process using the DR system 100 of FIG. 1, in accordance with embodiments of the present invention. The method 200 includes a first step 210 of importing and/or feeding historical time series data into the system at regular intervals including parameters and values of the parameters and a second step 220 of importing and/or feeding historical time series data of RPO for each application at regular intervals. The steps 210, 220 may include both receiving data including parameters affecting RPO for a DR plan and analyzing the parameters. Steps 210, 220 may be accomplished by, for example, the RPO predictor 110 and/or the data processor 112 thereof. The method 200 may include another step 230 of normalizing all the parameters such that all the parameters have the same scale and timeline with respect to each RPO. The steps 210, 220, 230 may each be accomplished by the data processor 112 of the RPO predictor 110, for example.

The method 200 includes another step 240 of fetching previous predictions if any previous predictions exist. The method 200 includes another step 250 of computing a weightage for each parameter to identify which parameter has influenced changes to RPO historically, taking into effect previous weightages that exist, if any previous weightages exist. These steps may be accomplished by the correlation engine 180, as described hereinabove. Thus, the method 200 may include determining a correlation between the responsible factors responsible for recovery point objective deviations.

The method 200 includes a step 260 of predicting an RPO for each possible future date and/or time for each application associated with a DR recovery plan. The method 200 includes a step 270 of predicting values for each parameter for each future date and/or time. The steps 260 and 270 may be accomplished by the RPO prediction engine 170 and may include determining responsible factors behind RPO deviation based on the analysis conducted in the previous steps 210, 220, 230, 240 and 250.

The method 200 includes a step 280 of computing weightages for each parameter to identify which parameters have influenced changes to the recovery point objectives historically for a given date and/or time. The step 280 may include maintaining all the predictions and weightages, for example, in the datastore 160 for future use when the data processor 112 and the RPO predictor 110 need the data for further predictions, machine learning, and the modelling. The step 280 may further include dynamically improving with a feedback loop, a DR model related to the received information or data associated with the parameters and/or values that has been imported and/or fed into the system. The correlation engine 180 may be responsible for performing the step 280.

The method 200 may include a step 290 of recommending improvements for a better and/or more accurate RPO for each application. These recommendations may be based on the predictions and correlations from the previous steps of the method 200. The step 290 may include recommending improvements to a DR plan based on determined responsible factors behind RPO deviations found by the RPO predictor 110. The method 200 may include a step 299 of showing a dashboard with respect to each application that may include the following information for each application: A) a historical RPO; B) historical parameters and/or values and their weightages; and C) a predicted RPO, parameters and/or values for their weightages predicted to influence this predicted RPO in the future. While not shown, the method 200 may include a step of implementing the recommended improvements on the DR recovery plan based on the recommendations. This may include improving SLA trends associated with the DR recovery plan.

Figure 6:
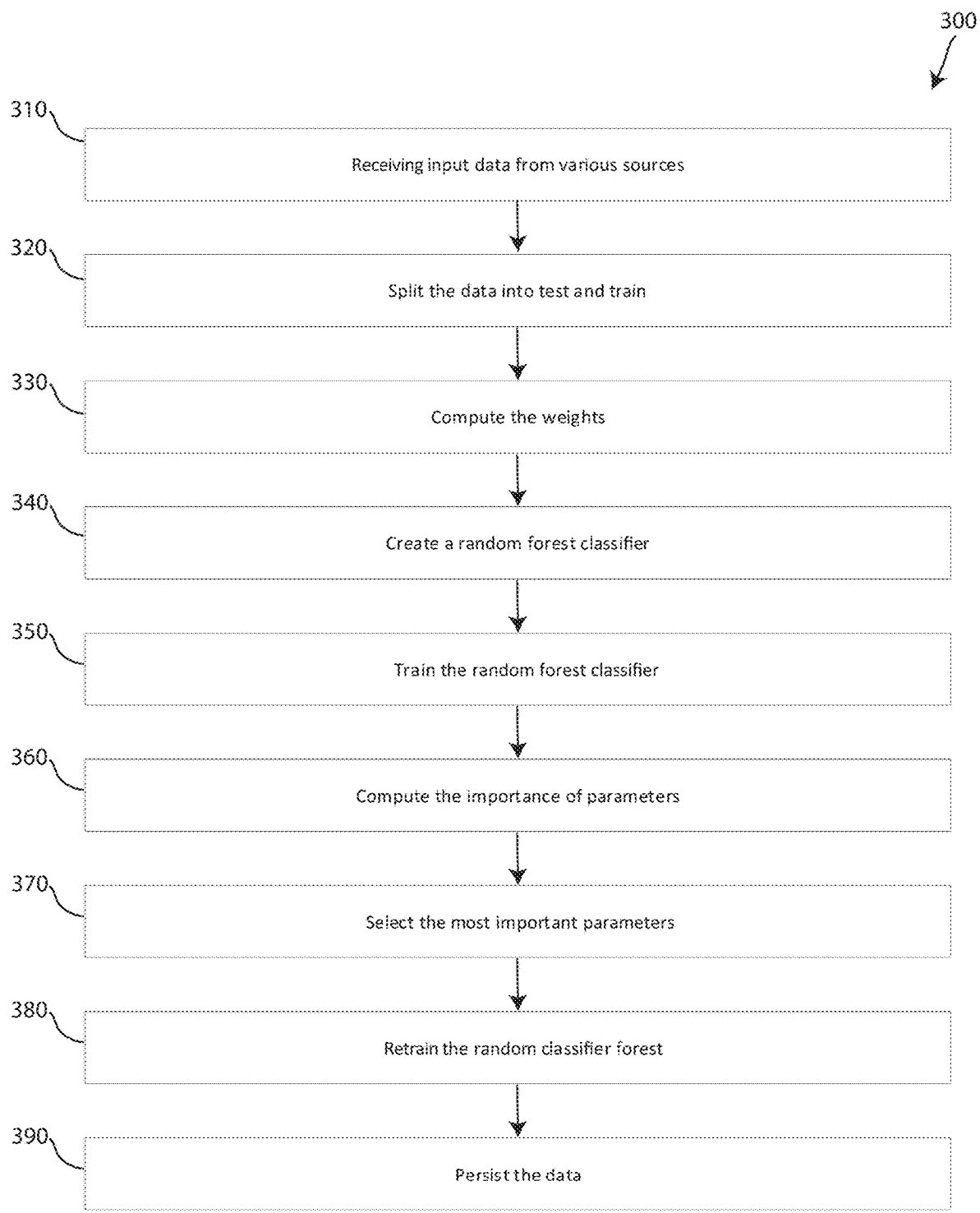
FIG. 6 depicts a flow chart of a method of correlating responsible factors responsible for recovery point objective deviations, in accordance with embodiments of the present invention.

FIG. 6 depicts a flow chart of a method 300 of correlating responsible factors responsible for recovery point objective deviations, in accordance with embodiments of the present invention. Embodiments include performing at least portions of the method 300 with the correlation engine 180. The method 300 includes a first step 310 of receiving input data from various sources. The method 300 may include a step 320 of splitting the data into test data and train data. The method 300 includes a step 330 of computing weights for the data. The method 300 includes a step 340 of creating a random forest classifier, as well as a step 350 of training the random forest classifier. The method 300 then includes a step 360 of computing the importance of parameters and a step 370 of selecting the most important of the parameters. The method 300 may then include a step 380 of retraining the random forest classifier based on the most important parameters and then a step 390 of maintaining, persisting or otherwise storing the ultimate data, model or results.

Figure 7:
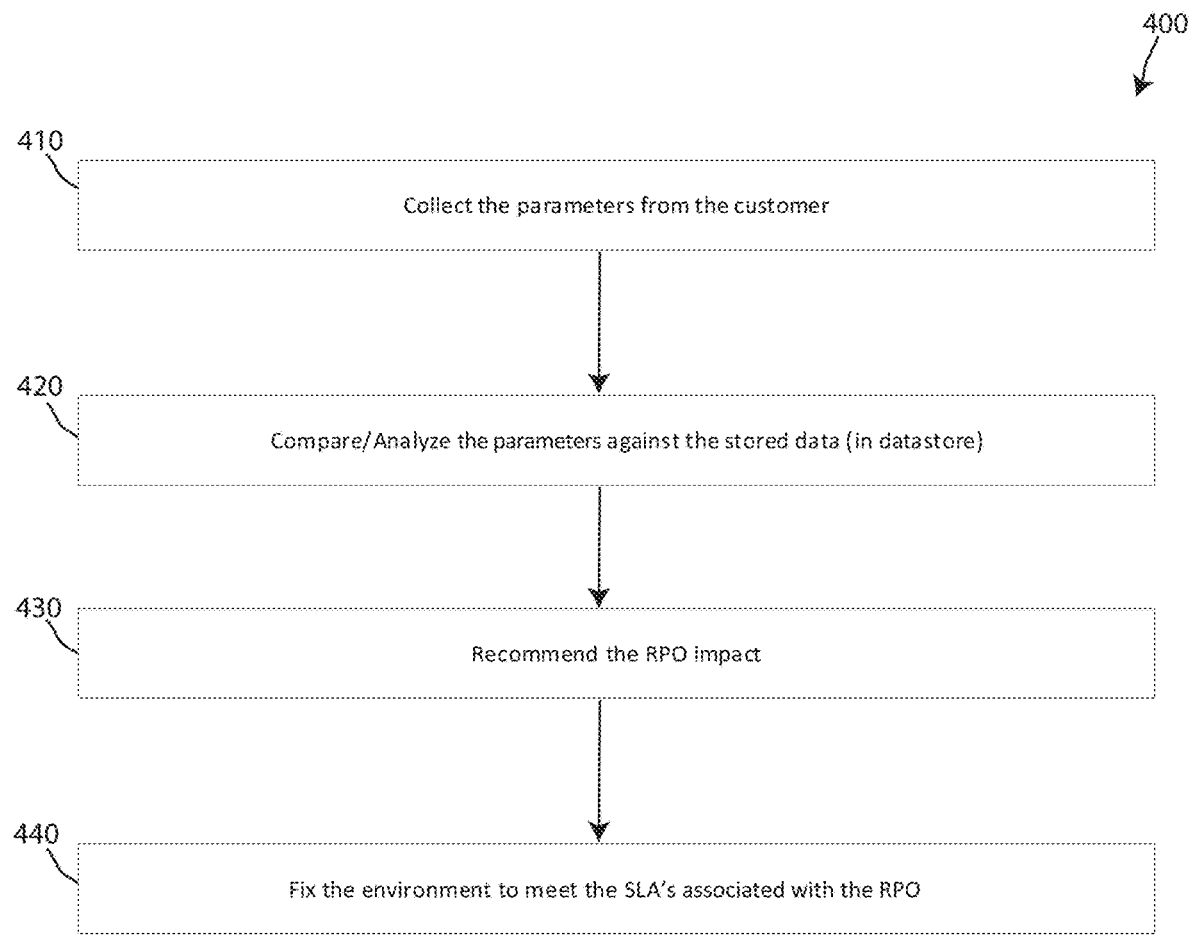
FIG. 7 depicts a flow chart of a method of making recommendations in accordance with embodiments of the present invention.

FIG. 7 depicts a flow chart of a method 400 of making recommendations in accordance with embodiments of the present invention. Embodiments include performing at least portions of the method 400 with the recommendation engine 190. The method 400 includes a step 410 of collecting the parameters from an entity or customer. The method 400 then includes a step of comparing and analyzing the parameters against the stored data, in for example the datastore 160. The method 400 includes a step 430 of recommending the RPO impact and a step 440 of fixing the environment to meet one or more SLAB associated with the RPO.

Figure 8:
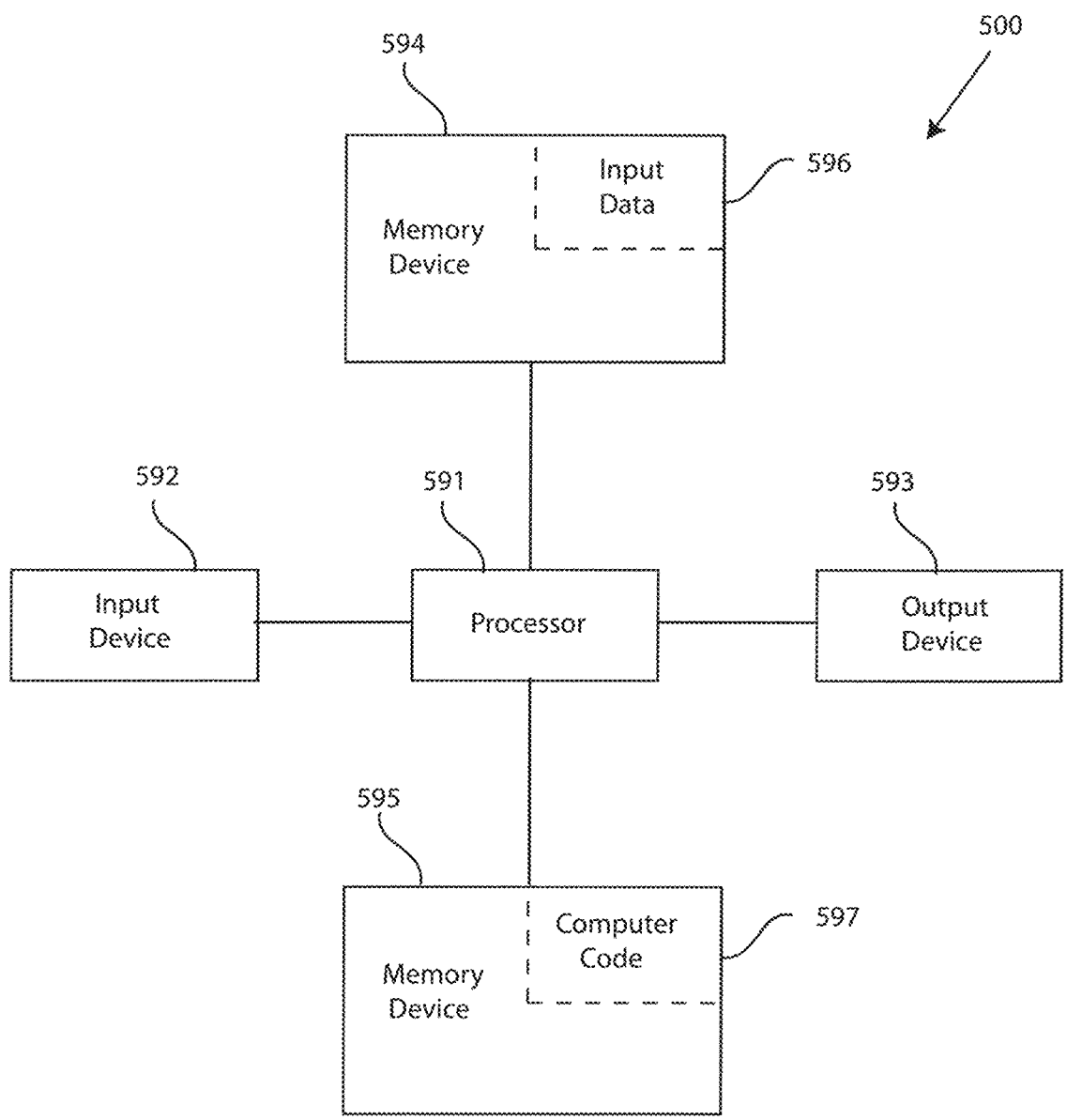
FIG. 8 depicts a block diagram of a computer system of the transportation system of FIG. 1, capable of implementing methods for transporting items in FIGS. 3-4, in accordance with embodiments of the present invention.
Figure 9:
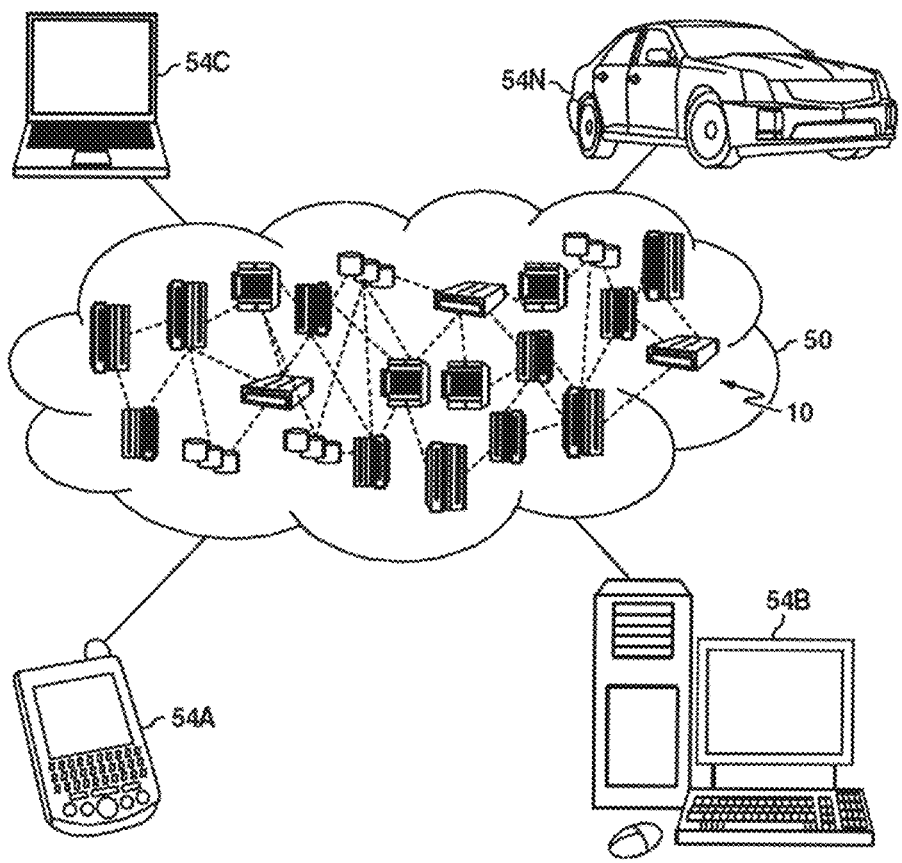
FIG. 9 depicts a cloud computing environment, in accordance with embodiments of the present invention.
Figure 10:
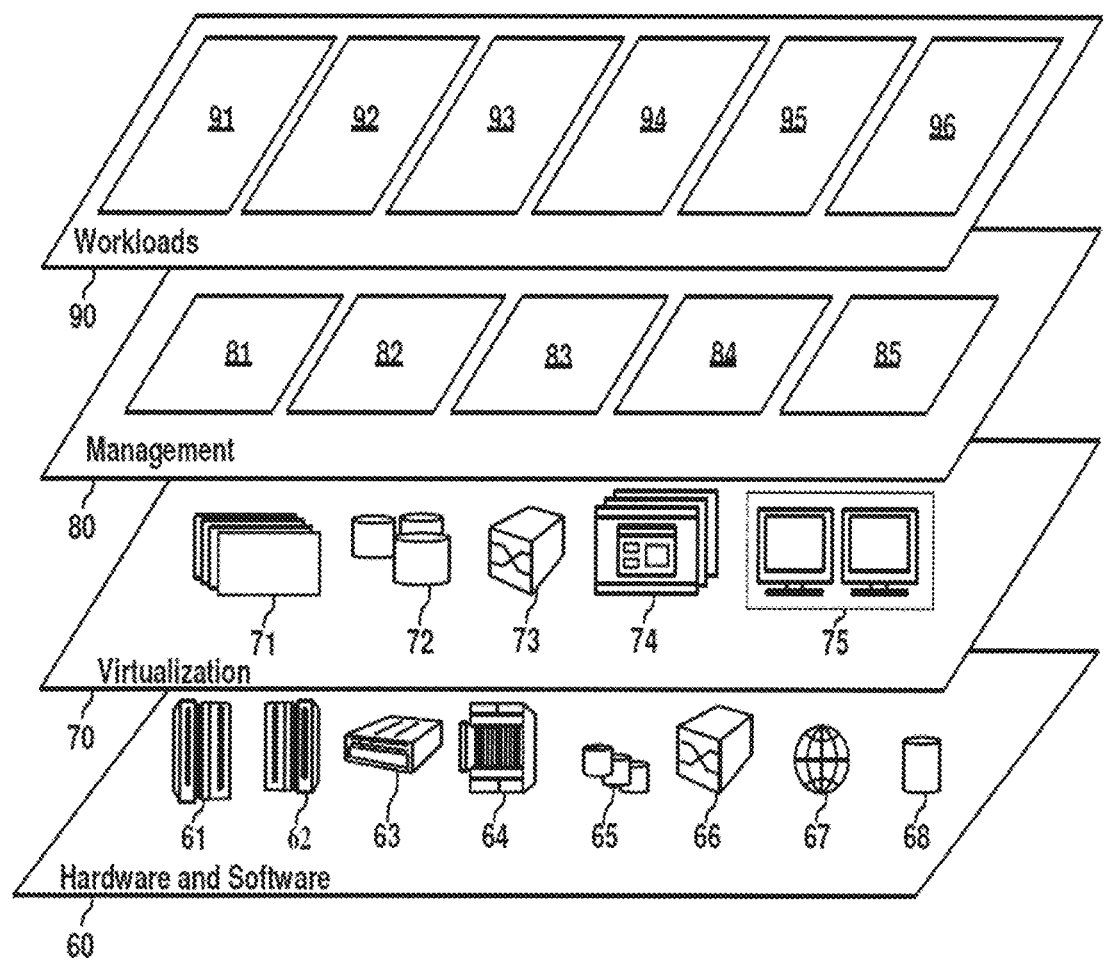
FIG. 10 depicts abstraction model layers, in accordance with embodiments of the present invention.

FIG. 8 illustrates a block diagram of a computer system that may representative of any computer or computer system within the disaster recovery system 100 of FIG. 1, capable of implementing methods of providing disaster recovery tools of FIGS. 5-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing methods of providing disaster recovery tools, in the manner prescribed by the embodiments of FIGS. 5-7 using the disaster recovery system 100 of FIG. 1, wherein the instructions of the computer code 597 may be executed by processor 591 via memory device 595. The computer code 597 may include software or program instructions that may implement one or more algorithms for implementing the methods of providing disaster recovery tools, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN), Further, memory devices 594, 595 may include an operating system (not shown) and may include other systems not shown in FIG. 5.

In some embodiments, the computer system 500 may further be coupled to an input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods of providing disaster recovery tools. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system to provide a disaster recovery system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of providing disaster recovery tools. Thus, the present invention discloses a process for supporting, deploying and/or integrating computer infrastructure, integrating, hosting, maintaining, and deploying computer-readable code into the computer system 500, wherein the code in combination with the computer system 500 is capable of performing methods of providing disaster recovery tools.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The compute readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate, Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser)

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to disaster recovery 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
receiving, by one or more processors of a computer system, data including parameters affecting recovery point objectives for a disaster recovery plan;
analyzing, by the one or more processors of the computer system, the parameters including computing weightages for the parameters to identify which of the parameters have influenced changes to the recovery point objectives historically;
determining; by the one or more processors of the computer system, responsible factors behind recovery point objective deviation based on the analyzing; and
implementing, by the one or more processors of the computer system, an improvement to the disaster recovery plan based on at least one determined responsible factor.

2. The method of claim 1, further comprising:
recommending, by the one or more processors of the computer system, improvements on the disaster recovery plan based on the determined responsible factors behind the recovery point objective deviation.

3. The method of claim 2, further comprising:
improving service level agreement trends associated with the disaster recovery plan.

4. The method of claim 2, wherein the analyzing further comprises:
normalizing; by the one or more processors of the computer system, the parameters such that all the parameters have the same timeline with respect to the recovery point objectives.

5. The method of claim 4, further comprising:
predicting, by the one or more processors of the computer system, the recovery point objective for a future time for each application associated with the disaster recovery plan; and
predicting, by the one or more processors of the computer system, values for each parameter at the future time.

6. The method of claim 5, further comprising:
dynamically improving with a feedback loop, by the one or more processors of the computer system, a disaster recovery model related to the received data related to the parameters affecting recovery point objectives.

7. The method of claim 6, further comprising:
determining, by the one or more processors of the computer system, a correlation between the responsible factors responsible for recovery point objective deviations.

8. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method, the method comprising:
receiving, by the one or more processors of the computer system, data including parameters affecting recovery point objectives for a disaster recovery plan;
analyzing, by the one or more processors of the computer system, the parameters including computing weightages for the parameters to identify which of the parameters have influenced changes to the recovery point objectives historically;
determining, by the one or more processors of the computer system, responsible factors behind recovery point objective deviation based on the analyzing; and
implementing, by the one or more processors of the computer system, an improvement to the disaster recovery plan based on at least one determined responsible factor.

9. The computer system of claim 8, the method further comprising:
recommending, by the one or more processors of the computer system, improvements on the disaster recovery plan based on the determined responsible factors behind the recovery point objective deviation.

10. The computer system of claim 9, the method further comprising:
improving service level agreement trends associated with the disaster recovery plan.

11. The computer system of claim 9, the method further comprising:
normalizing, by the one or more processors of the computer system, the parameters such that all the parameters have the same timeline with respect to the recovery point objectives.

12. The computer system of claim 11, the method further comprising:
predicting, by the one or more processors of the computer system, the recovery point objective for a future time for each application associated with the disaster recovery plan;
predicting, by the one or more processors of the computer system, values for each parameter at the future time.

13. The computer system of claim 12, the method further comprising:
dynamically improving with a feedback loop, by the one or more processors of the computer system, a disaster recovery model related to the received data related to the parameters affecting recovery point objectives.

14. The computer system of claim 8, the method further comprising:
determining, by the one or more processors of the computer system, a correlation between the responsible factors responsible for recovery point objective deviations.

15. A computer program product, comprising a computer readable storage medium storing a computer readable program code, the computer readable program code comprising an algorithm that when executed by one or more processors of a computer system implements a method, the method comprising: receiving, by the one or more processors of the computer system, data including parameters affecting recovery point objectives for a disaster recovery plan; analyzing, by the one or more processors of the computer system, the parameters including computing weightages for the parameters to identify which of the parameters have influenced changes to the recovery point objectives historically; determining, by the one or more processors of the computer system, responsible factors behind recovery point objective deviation based on the analyzing; and implementing, by the one or more processors of the computer system, an improvement to the disaster recovery plan based on at least one determined responsible factor.

16. The computer program product of claim 15, the method further comprising:
recommending, by the one or more processors of the computer system, improvements on the disaster recovery plan based on the determined responsible factors behind the recovery point objective deviation.

17. The computer program product of claim 15, the method further comprising:
improving service level agreement trends associated with the disaster recovery plan.

18. The computer program product of claim 17, the method further comprising:
normalizing, by the one or more processors of the computer system, the parameters such that all the parameters have the same timeline with respect to the recovery point objectives.

19. The computer program product of claim 18, the method further comprising:

predicting, by the one or more processors of the computer system, the recovery point objective for a future time for each application associated with the disaster recovery plan;

predicting, by the one or more processors of the computer system, values for each parameter at the future time.

20. The computer program product of claim 19, the method further comprising:

dynamically improving with a feedback loop, by the one or more processors of the computer system, a disaster recovery model related to the received data related to the parameters affecting recovery point objectives.

\* \* \* \* \*